United States Patent [19]
Suzuki et al.

[11] Patent Number: 5,822,156
[45] Date of Patent: Oct. 13, 1998

[54] MAGNETIC CIRCUIT OF A COIL MOTOR

[75] Inventors: Hironori Suzuki; Yoshihiro Sato, both of Kawasaki; Akiyoshi Adachi; Yasuo Suzuki, both of Higashine, all of Japan

[73] Assignees: Fujitsu Limited; Fujitsu Sinter Limited, both of Kawasaki, Japan

[21] Appl. No.: 573,592

[22] Filed: Dec. 15, 1995

Related U.S. Application Data

[63] Continuation of Ser. No. 116,075, Sep. 2, 1993, abandoned.

[30] Foreign Application Priority Data

Dec. 3, 1992 [JP] Japan ..................................... 4-324067

[51] Int. Cl.$^6$ ............................... G11B 5/55; G11B 33/14
[52] U.S. Cl. ........................................ 360/106; 360/97.03
[58] Field of Search ..................................... 360/106, 105, 360/97.01, 98.01, 97.02, 97.03; 310/154, 156, 258, 273, 42

[56] References Cited

U.S. PATENT DOCUMENTS

| | | | |
|---|---|---|---|
| 4,016,441 | 4/1977 | Herr et al. | 310/13 |
| 4,396,966 | 8/1983 | Scranton et al. | 360/106 |
| 4,506,307 | 3/1985 | Watrous | 360/106 |
| 4,544,972 | 10/1985 | Kpgure et al. | 360/106 |
| 4,580,072 | 4/1986 | Morishita | 310/42 |
| 4,661,729 | 4/1987 | Hames et al. | 310/154 |
| 4,827,173 | 5/1989 | Corbach et al. | 310/258 |
| 4,851,727 | 7/1989 | Tanaka | 310/154 |
| 4,860,137 | 8/1989 | Shtipelman | 360/106 |
| 4,890,176 | 12/1989 | Casey et al. | 360/106 |
| 5,128,818 | 7/1992 | Koizumi et al. | 360/99.04 |
| 5,448,437 | 9/1995 | Katahara | 360/106 |

FOREIGN PATENT DOCUMENTS

| | | | |
|---|---|---|---|
| 0467556 | 1/1992 | European Pat. Off. | 360/106 |

OTHER PUBLICATIONS

"Flat Pole Swing Arm Actuator", IBM Technical Disclosure Bulletin, vol. 28, No. 7, Dec. 1985, (3601106).

*Primary Examiner*—Craig A. Renner
*Attorney, Agent, or Firm*—Greer, Burns & Crain, Ltd.

[57] ABSTRACT

A magnetic circuit for a voice coil motor includes a yoke for guiding a magnetic flux, a permanent magnet magnetically detachably mounted upon the yoke for creating the magnetic flux, and a coil provided in correspondence to a magnetic gap formed by the yoke. The coil interlinks with the magnetic flux and is movable along the yoke. The yoke carries a projection, on a surface thereof on which the permanent magnet is mounted. The projection inhibits movement of the permanent magnet along the surface of the yoke. The permanent magnet is detachably mounted upon the surface of the yoke exclusively by a magnetic force associated with the magnetic flux of the permanent magnet.

6 Claims, 15 Drawing Sheets

MAGNETIC CIRCUIT OF A COIL MOTOR

This is a continuation of application Ser. No. 08/116,075, filed Sep. 2, 1993, now abandoned.

BACKGROUND OF THE INVENTION

The present invention relates to voice coil motors for use in magnetic disk drives for driving an actuator that carries a magnetic head.

Recently, storage capacity of magnetic disk drives is increasing rapidly. To achieve the desired increase of storage capacity, recent magnetic disk drives use a magnetic head that floats from the surface of a recording medium with a very small distance in the order of 0.2 μm. Thus, the magnetic disk drives are accommodated in a hermetically sealed enclosure such that no dusts or contaminant gases penetrate into the interior of the device.

In such circumstances, the voice coil motors used in the magnetic disk drives are also required to release no dusts or gases.

FIG. 1 shows an example of a magnetic circuit used in a conventional magnetic disk drive for driving a head actuator in a perspective view, while FIG. 2 shows the same magnetic circuit in a plan view.

Referring to FIGS. 1 and 2, the magnetic circuit includes a first yoke 1 and a second yoke 2, wherein the first yoke 1 is defined by a bottom part 1a that is laterally defined by side walls 1b and 1c, and the second yoke 2 is disposed on the first yoke 1 in contact with the top surfaces of the side walls 1b and 1c of the first yoke 1 such that the second yoke 2 faces the bottom part 1a of the first yoke 1.

The first yoke 1 carries, on a top surface of the bottom part 1a, a first permanent magnet 3 and a second permanent magnet 4, while the second yoke 2 carries on a bottom surface thereof that faces the foregoing top surface of the bottom part 1a of the first yoke 1, a third permanent magnet 6 and a fourth permanent magnet 7 arranged adjacent with each other.

As shown in FIG. 2, the permanent magnets 3, 4, 6 and 7 are magnetized to have respective polarities such that the surface of the first magnet 3 that faces the third magnet 6 has the N-pole, the surface of the third magnet 6 that faces the first magnet 3 has the S-pole, the surface of the second permanent magnet 4 that faces the fourth permanent magnet 7 has the S-pole, and the surface of the fourth magnet 7 that faces the second magnet 4 has the N-pole.

Thereby, the first through fourth magnets 3, 4, 6 and 7 create a magnetic flux M that is guided along the first and seconds yokes 1 and 2.

In addition, there is disposed an actuator coil (voice coil) 5 in correspondence to a magnetic gap G that is defined between the first yoke 1 and the second yoke 2.

In response to the drive current that flows through the coil 5 as indicated in FIG. 2, the coil 5 experiences a force F indicated by an arrow according to the Fleming's left hand rule, and the force F thus formed drives the actuator of the magnetic disk drive.

In the foregoing construction, it should be noted that the first and second permanent magnets 3 and 4 are mounted upon the first yoke 1 by a resin adhesive. Similarly, the third and fourth magnets 6 and 7 are mounted upon the second yoke 2 by a resin adhesive.

On the other hand, the coil 5 used in recent magnetic disk drives tends to exhibit increased heat generation in correspondence to the increased read/write speed of data on the magnetic disk. When the coil 5 is heated as such, the temperature of the magnetic circuit rises, and such a temperature rise in turn causes the foregoing resin adhesives to release contaminant gases that may contaminate the interior of the magnetic disk drive. Thereby, the risk that the magnetic disk drive experiences a serious operational failure increases substantially.

SUMMARY OF THE INVENTION

Accordingly, it is an object of the present invention to provide a novel and useful magnetic disk drive that has a magnetic circuit wherein the foregoing problems are eliminated.

Another and more specific object of the present invention is to provide a magnetic disk drive having a magnetic circuit of a voice coil motor, wherein release of contaminant gases is effectively suppressed.

Another object of the present invention is to provide a magnetic circuit of a voice coil motor for use in a magnetic disk drive, wherein the fabrication cost is minimized.

Another object of the present invention is to provide a magnetic disk drive having a magnetic circuit, said magnetic circuit comprising: a yoke for guiding a magnetic flux; and a permanent magnet for forming said magnetic flux, said permanent magnet being attached to a surface of said yoke by a magnetic force associated to said magnetic flux; wherein said yoke has a projection on said surface on which said permanent magnet is attached, for inhibiting the lateral movement of the magnet along said surface. According to the present invention, one can fix the permanent magnet upon the yoke without using the resin adhesive. Thereby, release of contaminant gases from the resin adhesive is successfully eliminated even when the temperature of the magnetic circuit has increased as a result of the high speed operation. According to another aspect of the present invention, it is possible to reduce the manufacturing cost of the magnetic disk drives. It should be noted that such a demand is particularly stringent in small size magnetic disk drives for use in low cost computers, and there is an acute demand for a voice coil motor that can be manufactured with a reduced cost.

In a preferred embodiment of the present invention, a plurality of such projections are provided on the yoke for inhibiting lateral movement of the magnet.

In another preferred embodiment of the present invention, the projections are formed in the form of separate projections that are arranged consecutively along the side wall of the permanent magnet.

Another object of the present invention is to provide a magnetic disk drive of any of the foregoing type, wherein the projections are formed by a press forming process. Thereby, the manufacturing cost of the magnetic disk drive is significantly reduced.

Another object of the present invention is to provide a magnetic disk drive having a magnetic circuit, said magnetic circuit comprising: a yoke for guiding a magnetic flux; and a permanent magnet for forming said magnetic flux, said permanent magnet being attached to a surface of said yoke; and urging means for urging said permanent magnet upon said surface of said yoke, wherein said surface of said yoke being provided with a projection for engagement with a side wall of said permanent magnet. According to the present invention, said permanent magnet is fixed upon the yoke without using resin adhesives. Further, the lateral displacement of the permanent magnet along the surface of the yoke is effectively eliminated as a result of the contact engagement of the projection against the side wall of the permanent magnet.

In a preferred embodiment of the present invention, the urging means comprises a lever member provided on said yoke.

In a more preferred embodiment, the lever member is formed to be resilient.

Another object of the present invention is to provide a magnetic disk drive having a magnetic circuit, said magnetic circuit comprising: a yoke for guiding a magnetic flux; and a permanent magnet for generating said magnetic flux, said permanent magnet being attached to a surface of said yoke by a magnetic force associated to said magnetic flux; and a depression provided on said surface in correspondence to the shape of said permanent magnet, for inhibiting said permanent magnet from a movement along said surface. According to the present invention, one can secure the permanent magnet upon the yoke without using resin adhesives. Thereby, the problem of contamination of the magnetic disk drive by contaminant gases is effectively eliminated. The lateral displacement of the permanent magnet is effectively eliminated by the engagement between the permanent magnet and the depression that is formed in conformity with the shape of the permanent magnet.

In a preferred embodiment of the present invention, said depression is formed by a press forming process. Thereby, one can reduce the manufacturing cost of the magnetic disk drive significantly.

Another object of the present invention is to provide a magnetic disk drive having a magnetic circuit, said magnetic circuit comprising: a yoke for guiding a magnetic flux; a pair of permanent magnets provided on said yoke so as to face with each other, said pair of permanent magnets forming a magnetic gap therebetween; and a coil provided in said gap in a manner movable along said gap; wherein said permanent magnets are formed in a trapezoidal form. According to the present invention, one can minimize the torque variation by shaping the permanent magnets in the trapezoidal form.

Other objects and further features of the present invention will become apparent from the following descriptions when read in conjunction with the attached drawings.

DETAILED DESCRIPTION OF THE PREFERRED EMBODIMENT

Figure 1:
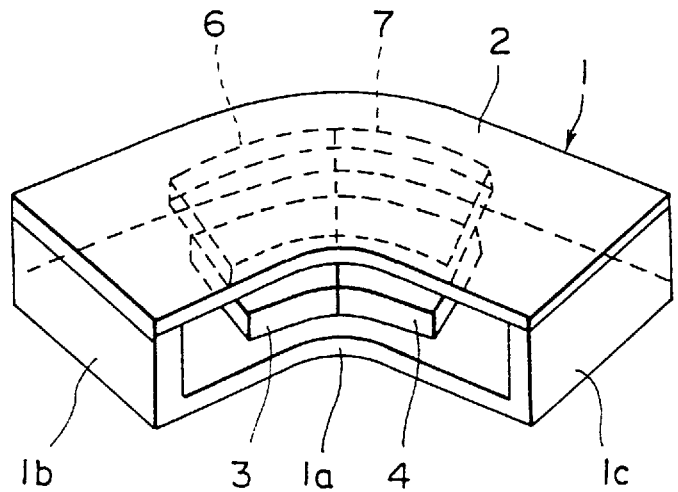
FIG. 1 is a diagram showing a magnetic circuit used in conventional magnetic disk drives.
Figure 2:
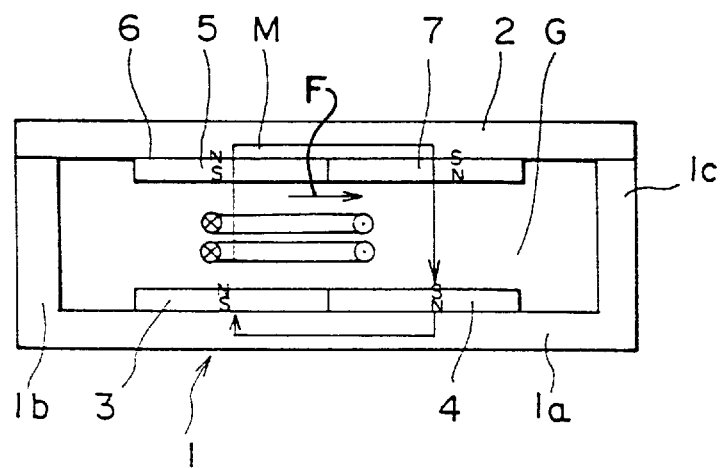
FIG. 2 is a diagram showing the magnetic circuit of FIG. 1 in a cross sectional view.
Figure 3A:
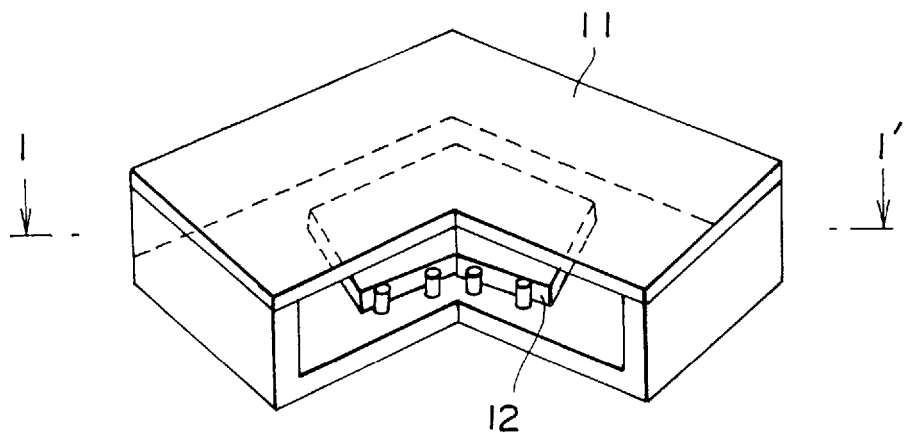
FIGS. 3(A) and 3(B) are diagrams showing the principle of the present invention.
Figure 3B:
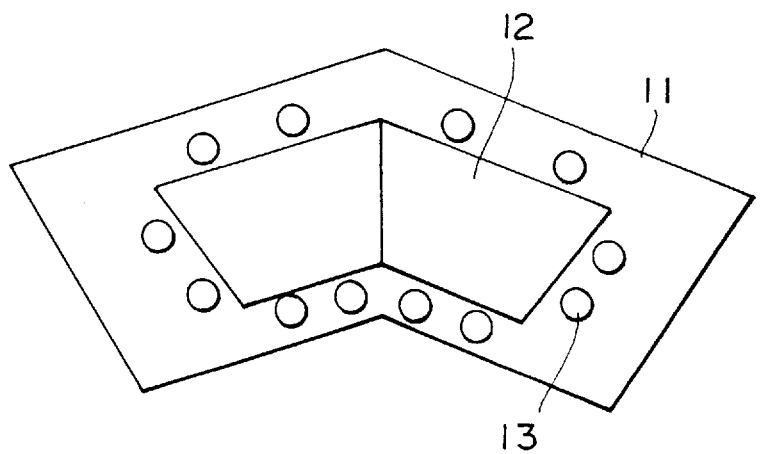

FIGS. 3(A) and 3(B) show the principle of the present invention respectively in a perspective view and in a cross sectional view taken along a line 1–1'.

Referring to the drawings, the magnetic circuit includes a yoke 11 for guiding a magnetic flux and a permanent magnet 12 that is mounted upon the yoke 11 by a magnetic force induced by the magnet 12 itself. Thereby, it should be noted that the surface of the yoke 11 on which the permanent magnet 12 is mounted, is provided with projections 13 for inhibiting the lateral movement of the magnet 12 along the surface of the yoke 11 that carries thereon the magnet 12.

Next, the overall construction of a magnetic disk drive of the present invention will be described with reference to FIGS. 4 and 5 respectively showing a horizontal cross sectional view and a vertical cross sectional view of a magnetic disk drive according to a first embodiment of the present invention.

Figure 4:
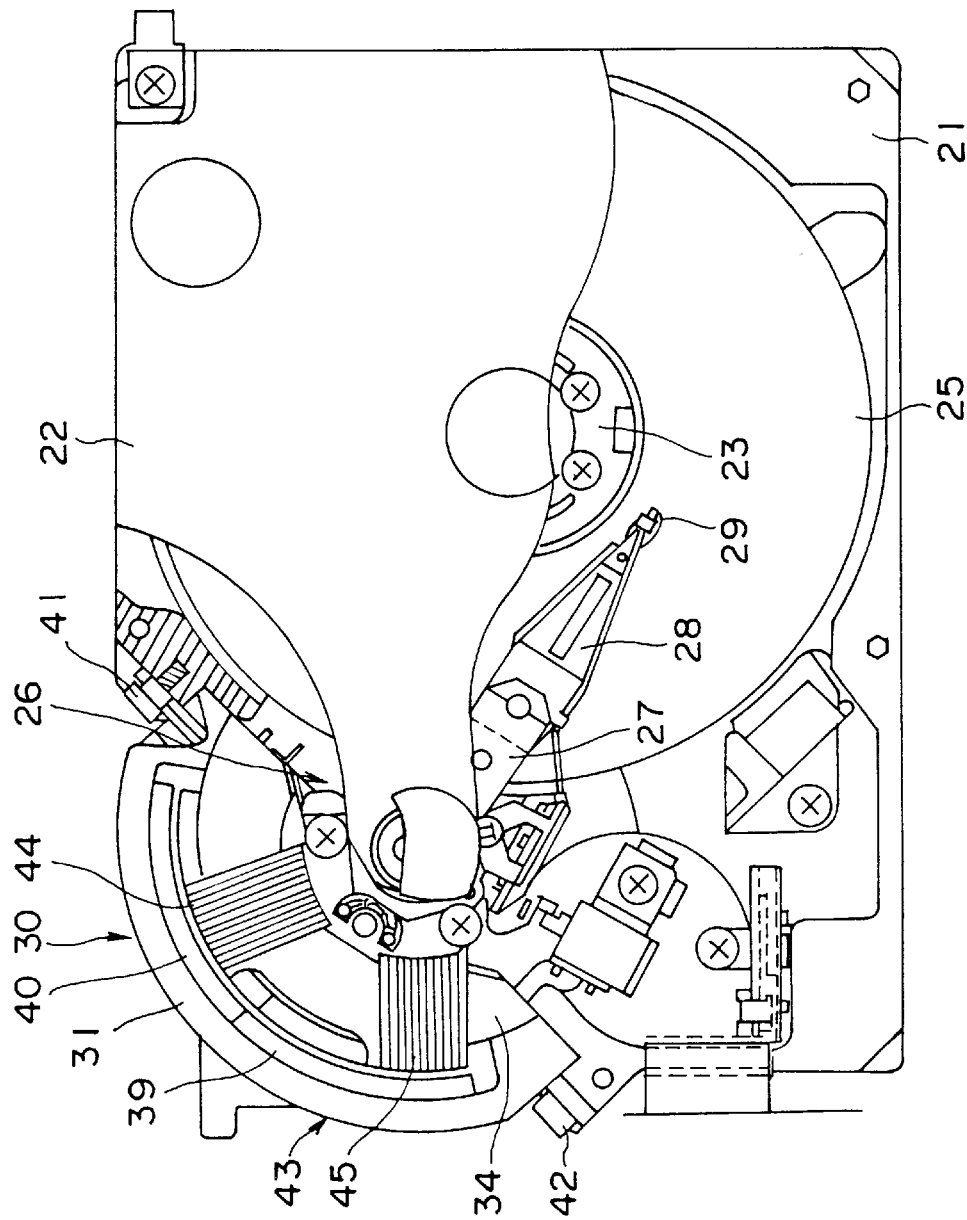
FIG. 4 is a diagram showing the construction of a conventional magnetic disk drive.
Figure 5:
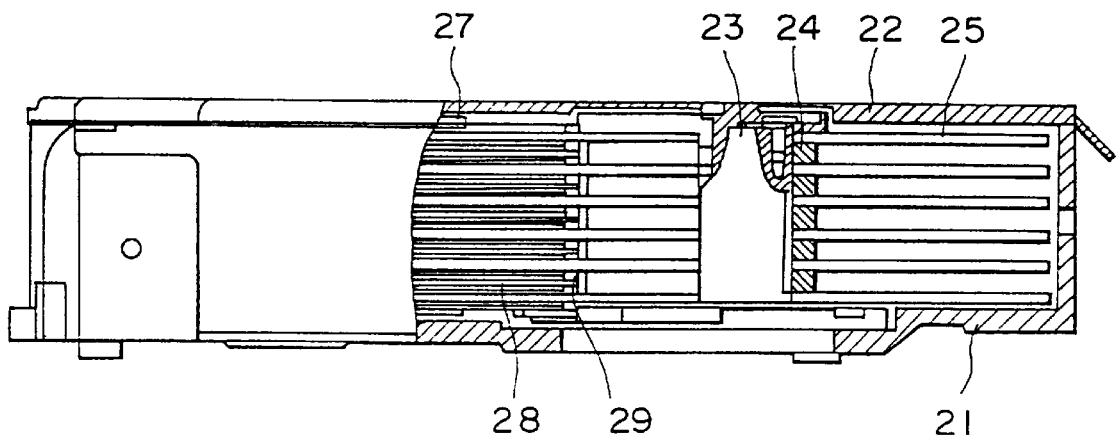
FIG. 5 is a diagram showing the magnetic disk drive of FIG. 4 in a cross sectional view.

Referring to FIGS. 4 and 5, the magnetic disk drive has an enclosure 21 having an opened top, and a cover lid 22 seals the opened top of the enclosure 21 hermetically. The enclosure 21 accommodates therein a spindle shaft 23 that is driven by an inner hub motor (not illustrated) at a high speed. The spindle shaft 23 has a cylindrical outer surface on which a plurality of magnetic disks 25 (six in the illustrated example) are mounted with a spacer member 24 intervening between adjacent disks 25.

In the interior of the enclosure 21, there is provided an actuator 26 in the vicinity of the magnetic disk 25 such that the actuator 26 is rotatable about an axis. More specifically, the actuator 26 has a first end thereof held rotatable about a rotational axis, and the other, second end of the actuator forms a head arm 27 that extends over the disk 25 to cross a plurality of tracks. The head arm 27 carries thereon a spring arm 28 such that the arm 28 extends further in the extending direction of the head arm 27 along a recording surface of the magnetic disk 25, and the spring arm 28 carries thereon a magnetic head 28 that carries out recording and/or reading of data on and from the recording surface of the magnetic disk 25.

It should be noted that the foregoing first end of the actuator 26 is provided with a voice coil motor 30 that is pertinent to the subject matter of the present invention.

Figure 6:
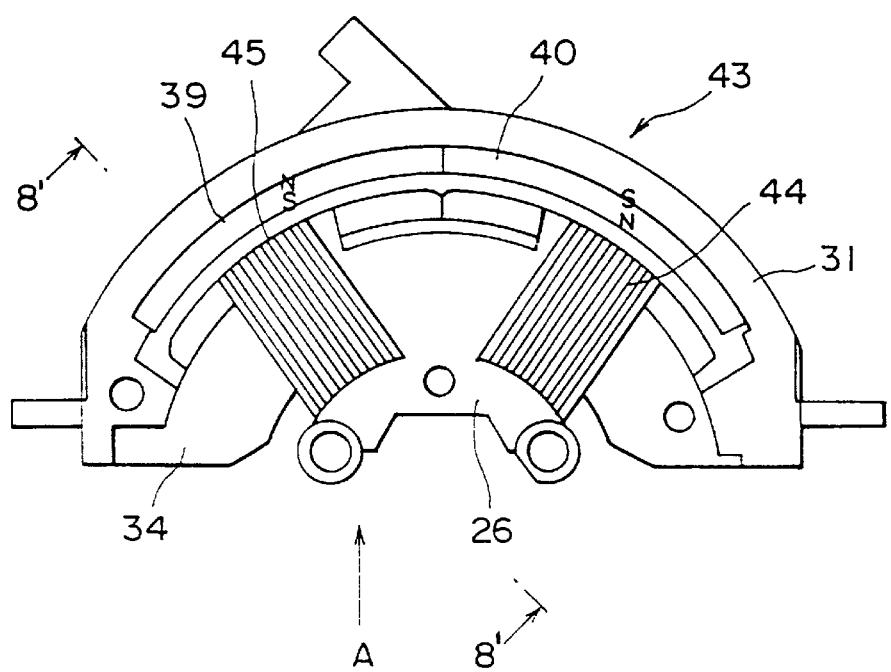
FIG. 6 is a diagram showing the voice coil motor used in the magnetic disk drive according to a first embodiment of the present invention in a plan view.
Figure 7:
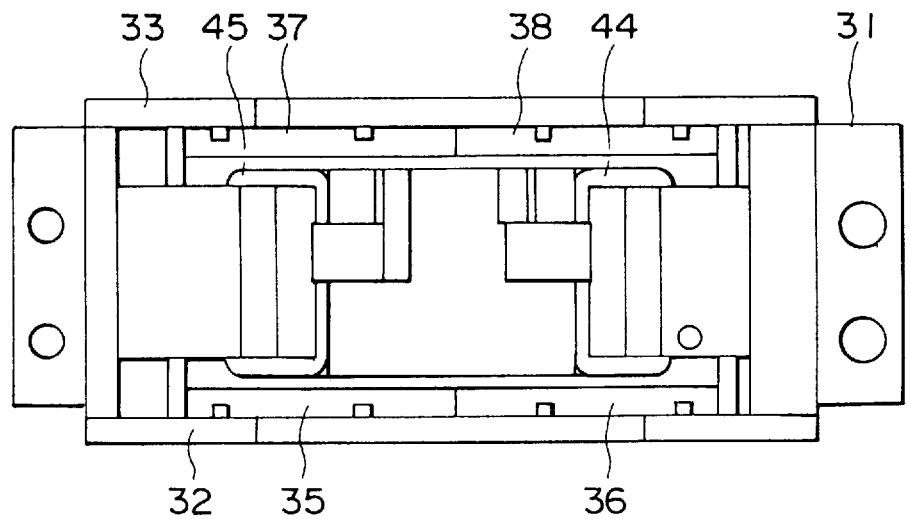
FIG. 7 is a diagram showing the voice coil motor viewed from a direction shown by an arrow in FIG. 6.
Figure 8:
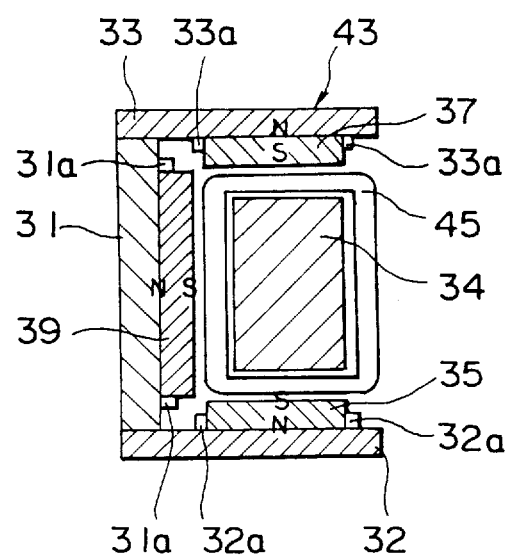
FIG. 8 is a diagram showing a part of the voice coil motor in a cross sectional view taken along a line 8–8' of FIG. 6.
Figure 9:
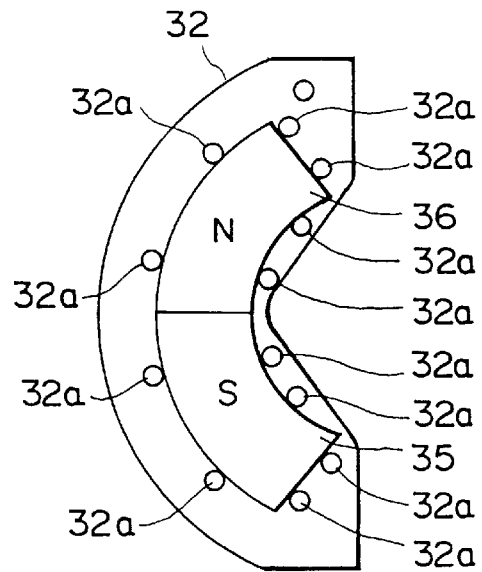
FIG. 9 is a diagram showing a lower yoke used in the voice coil motor of FIG. 7 in a plan view.
Figure 10:
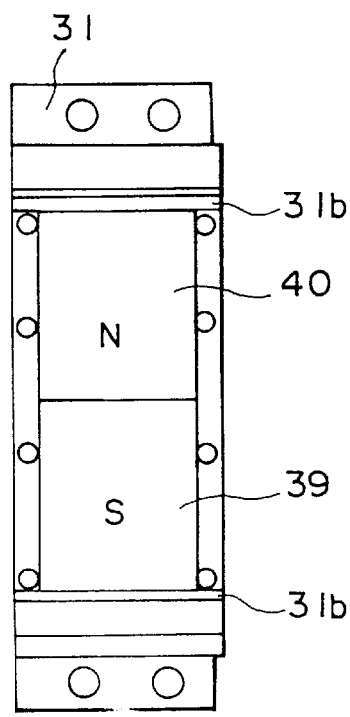
FIG. 10 is a diagram showing a side yoke used in the voice coil motor of FIG. 7 in a front view.
Figure 11:
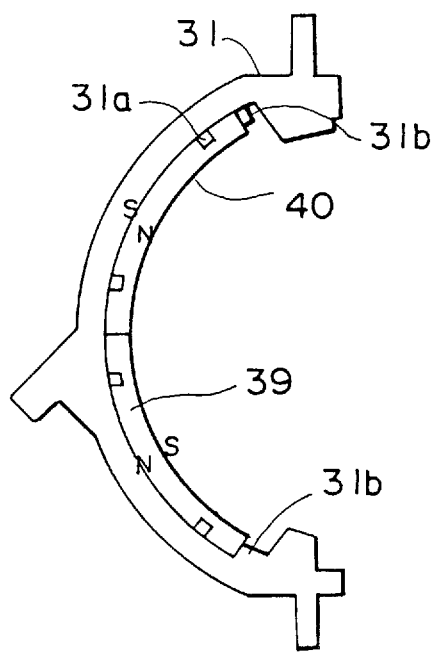
FIG. 11 is a diagram showing the side yoke of FIG. 10 in a plan view.

Hereinafter, a description will be made on the voice coil motor 30 of the first embodiment with reference to FIGS. 6–11, wherein FIG. 6 shows a partial horizontal cross section of the voice coil motor 30, while FIG. 7 shows the voice coil motor 30 viewed from the direction A. Further, FIG. 8 shows the voice coil motor 30 in a cross sectional view taken along a line 8–8' of FIG. 6, while FIG. 9 shows a part of the voice coil motor 30 of FIG. 6 in a plan view. In addition, FIG. 10 shows a front view of another part of the voice coil motor of FIG. 6, while FIG. 11 shows the top view of the part shown in FIG. 10.

In the foregoing drawings, it will be noted that the voice coil motor 30 includes a side yoke 31 that is formed in an arcuate form to fit into the enclosure 21. The side yoke 31 is mounted upon the enclosure 21 by screws 41 and 42 at both lateral edge parts thereof, and the side yoke 31 forms thereby a side wall of the enclosure 21.

Above and below the side yoke 31, there are provided an upper yoke 33 and a lower yoke 32 respectively, wherein the upper yoke 33 has a shape generally identical to the shape of the lower yoke 32.

Further, the side yoke 31 is provided, upon the side wall thereof, with a fan-shaped center yoke 34 that has a curvature larger than that of the side yoke 31, wherein the center yoke 34 is provided with a generally constant separation from any of the side yoke 31, the lower yoke 32 and the upper yoke 33. Thereby, there is formed a magnetic gap in correspondence to the foregoing separation. Further, as indicated in FIG. 9, two permanent magnets 35 and 36 having mutually opposite poles are provided adjacent with each other on the surface of the lower yoke 32 such that the magnets 35 and 36 face the center yoke 34. Similarly, the upper yoke 33 carries thereon permanent magnets 37 and 38 having mutually different polarities such that the magnets 37 and 38 are disposed adjacent with each other and face the center yoke 34. Additionally, the side yoke 31 carries thereon permanent magnets 39 and 40 having different poles such that the magnets 39 and 40 are disposed adjacent with each other so as to face the center yoke 34 as indicated in FIGS. 10 and 11. Thereby, the side yoke 31, the lower yoke 32, the upper yoke 33, the center yoke 34, the magnets 35 and 36, the magnets 37 and 38, and the magnets 39 and 40 form together a magnetic circuit 43.

As noted before, the actuator 26 has the first end held rotatable about an axis, wherein coils 44 and 45 are provided on the foregoing first end of the actuator 26 in correspondence to a gap (magnetic gap) that is formed between the center yoke 34 and other parts of the yoke such as the side yoke 31, the lower yoke 32, and the upper yoke 33, such that the coils 44 and 45 surround the center yoke 34 and move along the magnetic gap. Thereby, the magnetic circuit 43 and the coils 44 and 45 form together a voice coil motor or a force motor of the moving coil type.

Next, the assembling of the permanent magnets on the yokes 31, 32 and 33 will be described with reference to FIGS. 9 and 10. First, the mounting of the magnets 35 and 36 upon the yoke 32 will be described with reference to FIG. 9.

Referring to FIG. 9, the magnets 35 and 36 are attached to the yoke 32 by the magnetic force that is induced by the magnets 35 and 36 as a result of the magnetic fluxes created by the magnets 35 and 36 themselves. Further, in order to inhibit the lateral movement of the magnets 35 and 36 along the surface of the yoke 32, which faces the center yoke 34 and on which the magnets 35 and 36 are attached, a plurality of projections 32a are formed on the surface of the yoke 32 in conformity with the outer shape of the lower magnets 35 and 36, with minimum or substantially no tolerance with respect to the side wall of the magnets 35 and 36.

Figure 12:
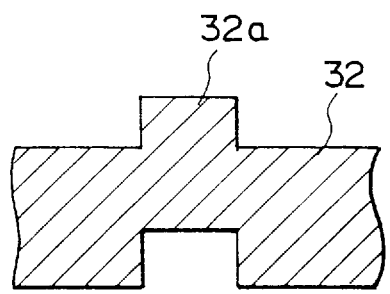
FIG. 12 is a diagram showing a projection formed on a yoke of FIG. 9 in a cross sectional view.

In the present embodiment, the projections 32a have a cross section illustrated in FIG. 12 and are formed conveniently by a press forming process. In small size magnetic disk drives, the magnetic yokes generally have a very small thickness, and formation of such projection by the press forming process can be achieved easily.

Similarly, the magnets 37 and 38 are mounted upon the upper yoke 33 by their own magnetic forces as in the case of the lower yoke 32. Thereby, the yoke 33 also has a plurality of projections 33a on the surface that carries the magnets 37 and 38 thereon, in conformity to and with minimum tolerance with respect to the side wall of the magnets 37 and 38, for inhibiting the lateral movement of the magnets.

In addition, the magnets 39 and 40 are mounted upon the side yoke 31 as indicated in FIGS. 10 and 11, wherein it will be noted that the side yoke 31 carries a pair of steps 31b in correspondence to both longitudinal ends of the area of the surface on which the magnets 39 and 40 are to be mounted, such that the tolerance between the step 31b and the magnet 39 or 40 becomes minimum. In addition, the yoke 31 carries a plurality of projections 31a on the surface on which the magnets 39 and 40 are mounted, such that the projections 31a engage with the magnet 39 at the upper side wall thereof and at the lower side wall thereof with a minimum or no substantial tolerance. Thereby, the magnets 39 and 40 attached to the side yoke 31 by own magnetic force, are inhibited from lateral movement along the surface by the projections 31a and the steps 31b.

Next, the operation of the magnetic disk drive of the foregoing construction will be described.

Upon the throwing of power, the inner hub motor is activated and the magnetic disks 25 are driven at a high speed such as 3600 rpm. Further, the coils 44 and 45 are activated by a control circuit not illustrated. Thereby, the coils 44 and 45, disposed in the magnetic gap of the magnetic circuit 43, experiences a thrust force and the actuator 26 is swung in response thereto. Thereby, the head arm 27 scans the magnetic disk 25 to cross the tracks that are defined on the magnetic disk 25. As a result of the energization of the actuator 26, the magnetic head 29 moves over the surface of the magnetic disk 25 to a target track, and achieves the desired reading or writing of data from and to the magnetic disk 25.

According to the foregoing construction, the assembling process including the mounting of the magnets 39 and 40 on the side yoke 31, mounting of the magnets 35 and 36 on the lower yoke 32, and mounting of the magnets 37 and 38 upon the upper yoke 33 are achieved without using adhesives, contrary to the conventional magnetic disk devices. As noted already, the mounting of these magnets is achieved by the magnetic force induced by each of the magnets. Further, the lateral movement of the magnets along the surface of the yoke on which the magnets are mounted, is effectively inhibited by the projections and/or steps. Thereby, even when heating occurs in the coils 44 or 45, release of adhesive contaminant gases does not occur and the interior of the magnetic disk drive is held clean.

Further, the magnetic disk drive of the present embodiment is advantageous in the point that the projections 32a can be formed with a cheap cost, by employing a press forming process. Of course, the process for forming the projections 32a is not limited to the foregoing press forming process, but may be achieved by implanting pins into the lower yoke 32. Alternatively, one may form the yoke to have projections from the beginning when one uses a yoke that is formed by a sintering process.

Next, a second embodiment of the present invention will be described with reference to FIGS. 13–16. The present embodiment differs from the first embodiment primarily with regard to the mounting of the magnets upon corresponding yokes. As other aspects of the present embodiment are substantially identical with the first embodiment, only those parts that differs in both embodiments will be described.

Figure 13:
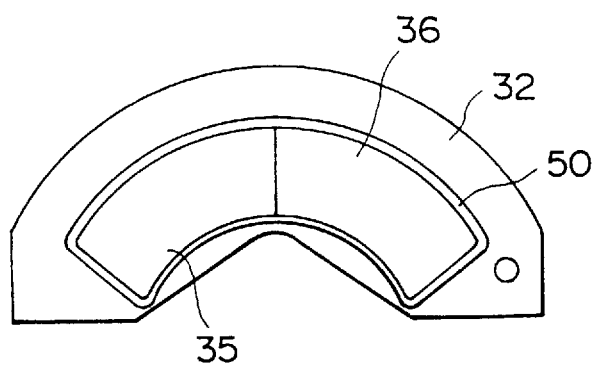
FIG. 13 is a diagram showing a lower yoke used in the magnetic circuit according to a second embodiment of the present invention.
Figure 14:
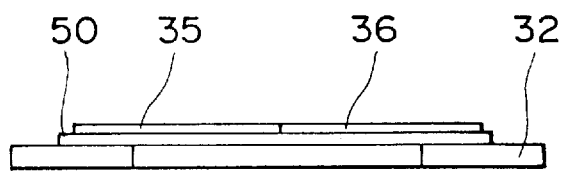
FIG. 14 is a diagram showing the lower yoke of FIG. 13 in a front view.

First, the mounting of the lower magnets upon the lower yoke will be described with reference to FIG. 13 that shows the lower yoke in a plan view and further with reference to FIG. 14 that shows the lower yoke of FIG. 13 in a front view.

Similarly to the embodiment before, the lower yoke 32 carries thereon the magnets 35 and 36 that are attached thereto by their own magnetic forces. Further, the lower yoke 32 carries an elongated projection or ridge 50 on the surface that faces the center yoke 34 and on which the magnets 35 and 36 are mounted, such that the ridge 50 is formed in conformity to the outer shape of the magnets 35 and 36 with a minimum tolerance. Similarly, the magnets 37 and 38 are mounted upon the upper yoke 33. As the construction for mounting the magnets 37 and 38 upon the upper yoke 33 is substantially identical with the foregoing construction for the lower yoke 32, further description will be omitted.

Figure 15:
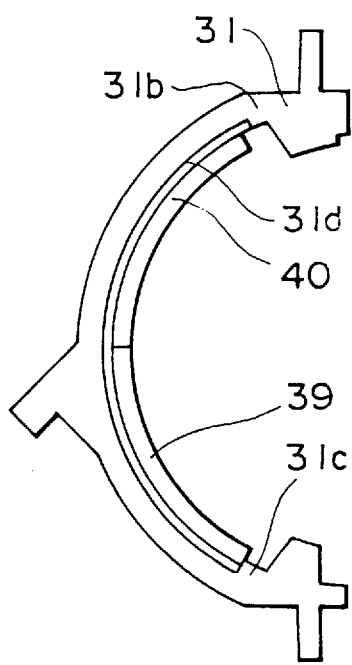
FIG. 15 is a diagram showing the side yoke used in the magnetic circuit of the second embodiment.
Figure 16:
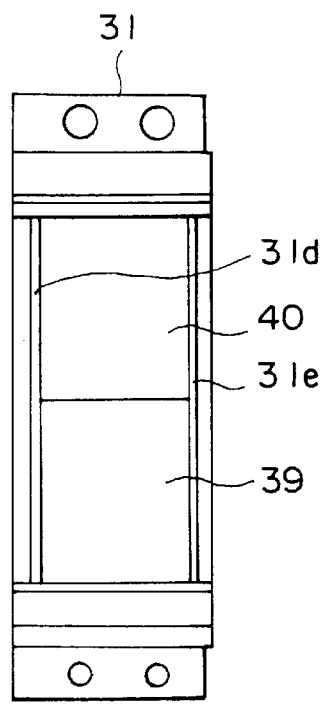
FIG. 16 is a diagram showing the side yoke of FIG. 15 in a right side view.

Next, the assembling of the magnets 39 and 40 upon the yoke 31 in the second embodiment will be described with reference to FIGS. 15 and 16. At both opposing ends of the area or surface of the side yoke 31 on which the magnets are mounted, there are provided stepped parts 31b and 31c such that the steps 31b and 31c support the magnet 39 at longitudinal ends thereof with a minimum or substantially no tolerance. Further, the foregoing area of the side yoke 31 is formed with a pair of elongate projections or ridges 31d and 31e such that the projections 31d and 31e support the upper and lower side walls of the magnet 39 with a minimum or substantially no tolerance therewith.

Thereby, the magnets 39 and 40 are attached to the side yoke 31 by the own magnetic force, while the lateral movement of the magnets 39 and 40 along the surface of the yoke 31 is effectively and substantially inhibited by the steps 31b and 31c as well as by the projections 31d and 31e that engage with the magnets.

According to the foregoing construction, mounting of the magnets 35–40 upon the corresponding yokes 31, 32 and 33 is achieved by the magnetic force of the magnet itself, without using adhesives, contrary to the conventional magnetic disk drives. Thereby, the lateral movement of the magnets on the yoke along the surface on which the magnets are mounted, is effectively inhibited by the projections 31d and 31e as well as by the steps 31b and 31c. Thus, even when a heating occurs in the coils 44 and 45, no adhesive contaminant gases are released and the interior of the magnetic disk drive is held clean.

In the foregoing embodiment, it should be noted that one may form the projections 31d and 31e in the form of a number of separate projections.

Next, a third embodiment of the present invention will be described with reference to FIGS. 17–25, wherein the present embodiment relates to a magnetic disk drive having a structure substantially identical with the magnetic disk drives of the previous embodiments except for the magnetic circuit. In the description hereinafter, only those parts that are different from the parts of the previous embodiments will be described, while the description of other parts will be omitted.

Figure 17:
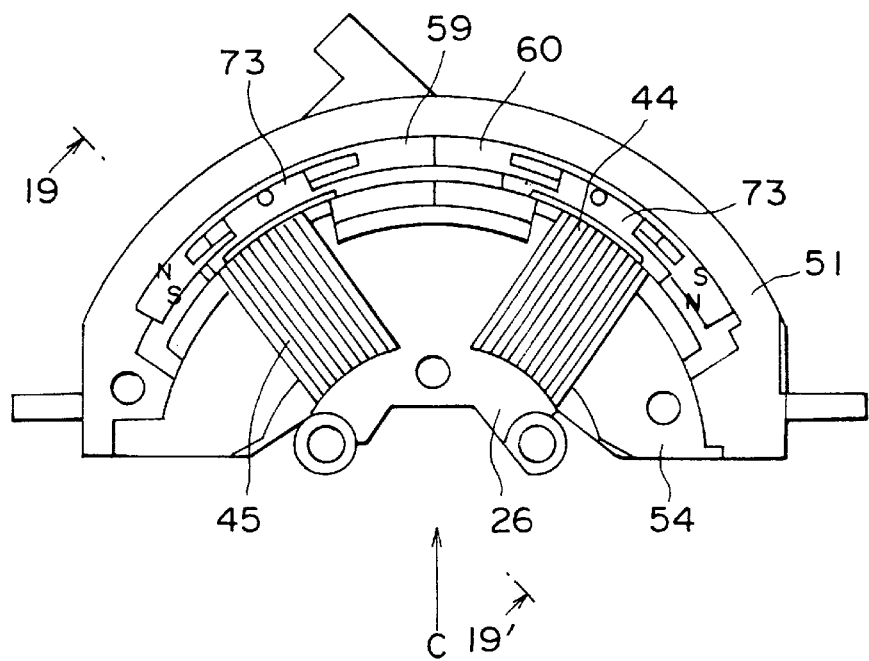
FIG. 17 is a diagram showing the voice coil motor according to a third embodiment of the present invention.

Referring to FIG. 17, the magnetic circuit includes an arcuate side yoke 51 that is mounted upon the enclosure by screws similarly to the previous embodiments. The side yoke 51 thereby acts as an outer wall of the enclosure.

Below the side yoke 51, there is provided a lower yoke 52, while an upper yoke 53 having a shape substantially identical to the lower yoke 52 is provided on the side yoke 51.

The side yoke 51 further carries, on a side wall thereof, a fan-shaped center yoke 54 that has a curvature larger than the curvature of the side yoke 51. The center yoke 54 is thereby separated from any of the side yoke 51, the lower yoke 52 and the upper yoke 53 by a substantially constant gap to form a substantially uniform magnetic gap. Further, the lower yoke 52 carries a pair of magnets 55 and 56 on a surface that faces the center yoke 54 such that the magnets 55 and 56 show mutually opposite poles. Similarly, the upper yoke 53 carries, on a surface thereof that faces the center yoke 54, a pair of magnets 57 and 58 such that the magnets 57 and 58 show mutually opposite poles. Furthermore, the surface of the side yoke 51 that faces the center yoke 54 is provided with magnets 59 and 60 such that the magnets 59 and 60 show mutually opposite poles.

Thereby, the side yoke 51, the lower yoke 52, the upper yoke 53, the center yoke 54, and the magnets 55–60 form a magnetic circuit 63. The actuator 26 carries thereon coils 44 and 45 on the axially supported first end part thereof such that the coils 44 and 45 are disposed in correspondence to the foregoing magnetic gap so as to surround and move along the center yoke 54.

Next, the assembling of the permanent magnets upon the yokes 51, 52 and 53 will be described. First, the mounting of the magnets 55 and 56 upon the lower yoke 52 will be described with reference to FIGS. 20 and 21. Similarly to the previous embodiments, the magnets 55 and 56 are mounted upon the lower yoke 52 by their own magnetic forces.

On the surface of the yoke 52 on which the magnets 55 and 56 are mounted adjacent to and in contact with each other, projections 67 and 68 are formed so as to engage with the side wall of the magnets 55 and 56 at the side of the actuator 26. Further, a projection 69 is formed for engagement with the side wall of the magnet 55 away from the side wall of the magnet 55 that is in contact with the magnet 56. In addition, there is provided a projection 70 for contact with the side wall of the magnet 56 at a side away from the side wall that contacts with the magnet 55. Furthermore, projections 71 and 72 are formed on the surface of the yoke 52 on which the magnets 55 and 56 are provided in correspondence to the side of the magnets away from the actuator 26, wherein the projections 71 and 72 are provided with holding members 73 and 74 respectively.

Figure 18:
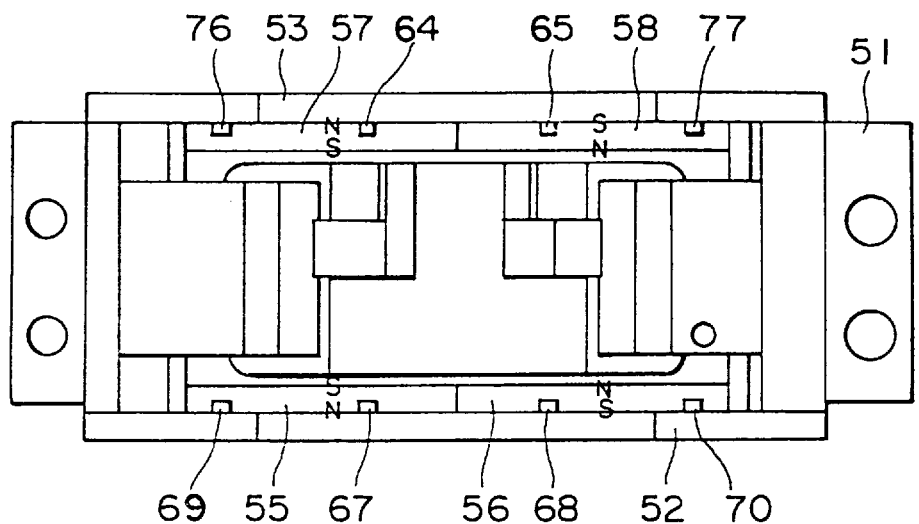
FIG. 18 is a diagram showing the voice coil motor of FIG. 17 viewed from a direction of an arrow C in FIG. 17.
Figure 19:
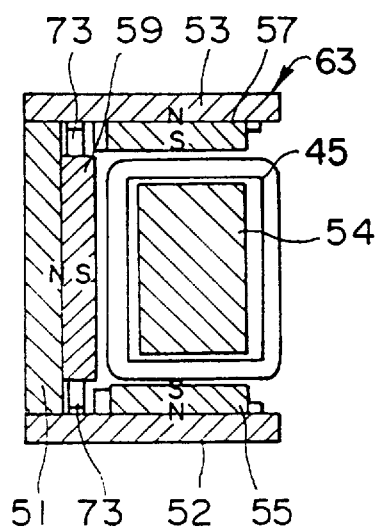
FIG. 19 is a cross sectional view taken along a line 19–19' of FIG. 17.

Similarly, the upper yoke 53 carries, on the surface thereof on which the magnets 57 and 58 are mounted adjacent to and in contact with each other, projections 64 and 65 shown in FIG. 18 such that the projections 64 and 65 engage with the side walls of the magnets 57 and 58 at a far side from the actuator 26. In addition, there is provided a projection 76 for engagement with the side wall of the magnet 57 at a side away from the side of the magnet 57 that contacts to the magnet 58, and another projection 77 is formed on the foregoing surface for engagement with the side wall of the magnet 58 at a side away from the side wall of the magnet 58 that contacts to the magnet 57. Furthermore, the yoke 53 carries, on the surface thereof on which the magnets 57 and 58 are provided, projections corresponding to projections 71 and 72 (not illustrated) at a far side from the actuator 26. Those projections also carry the holding members 73 and 74 respectively.

Hereinafter, the holding member 73 will be described with reference to FIGS. 22–25. It should be noted that the construction for the holding member 74 is substantially identical to the holding member 73.

The holding member 73 is formed of a resilient plastic to have a generally arcuate form, and carries a cutout part 80 on an outer arcuate side wall in correspondence to a central part of the member 73, such that the cutout 80 engages with the projections 71, 72, provided on yoke 52 and the projections (not illustrated) carried on yoke 53 corresponding to projections 71 and 72 that are provided on the yokes 52 and 53.

At both longitudinal ends of the member 73, the member 73 carries first and second cutouts 81 and 82, wherein the first cutout 81 defines a first pressing part 83 and a second pressing part 84 in correspondence to a first longitudinal end of the member 73 such that the pressing part 83 is located at a radially inner side of the arcuate-shaped member 73 with respect to the pressing part 84. Similarly, a third pressing part 85 and a fourth pressing part 86 are formed in correspondence to a second, opposite longitudinal end of the member 73 such that the second cutout 82 defines the third pressing part 85 and the fourth pressing part 86. As a result of formation of the first and second cutouts 81 and 82, the first through fourth pressing parts 83–86 are formed deformable in the direction indicated in FIG. 22 by an arrow G that points toward the rotational axis of the actuator 26.

Figure 23:
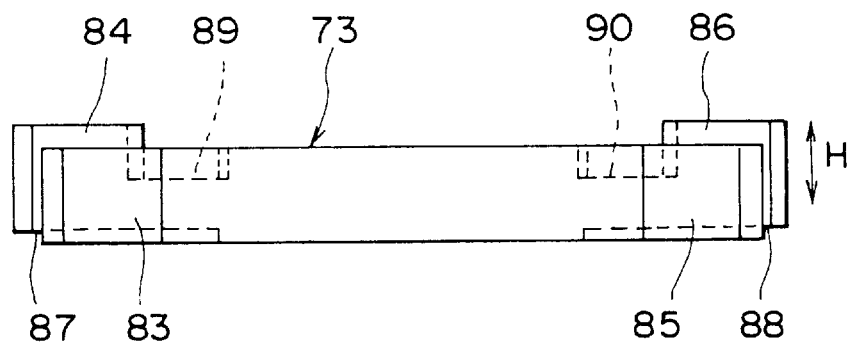
FIG. 23 is a diagram showing the member of FIG. 22 in a front view.
Figure 24:
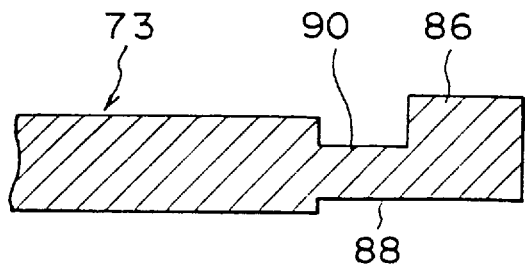
FIG. 24 is a diagram showing the member of FIG. 22 in a cross sectional view taken along a line 24–24'.
Figure 25:
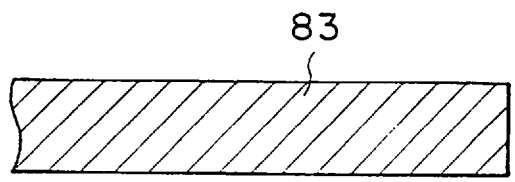
FIG. 25 is a diagram showing the member of FIG. 22 in a cross sectional view taken along a line 25–25'.

It should be noted that the lower surfaces of the second and fourth pressing parts 84 and 86 are formed such that there is formed a gap 87 or 88 between the lower surface of the pressing part and the opposing surface of the yoke 52 or 53 on which the magnets are mounted, as indicated in the front view of FIG. 23. Further, on the upper surfaces of the second pressing part 84 and the fourth pressing part 86, there are formed first and second depressions 89 and 90 respectively. By forming the foregoing gaps 87 and 88 and the depressions 89 and 90, the second and fourth pressing parts 84 and 86 are formed deformable in the H-direction shown in FIG. 23 that generally coincides to the rotating direction of the actuator 26.

Figure 20:
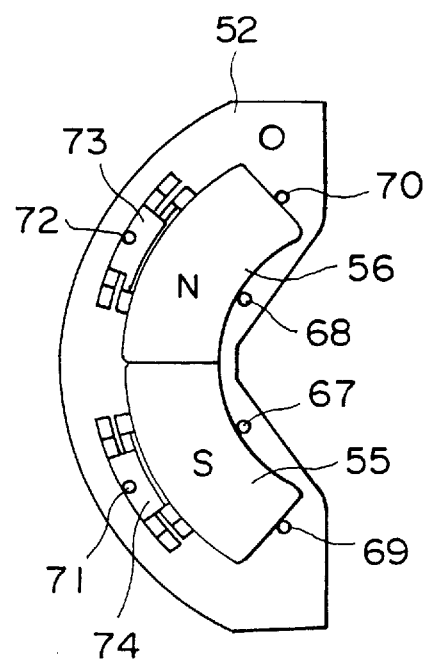
FIG. 20 is a diagram showing a lower yoke shown in FIG. 18 in a plan view.
Figure 21:
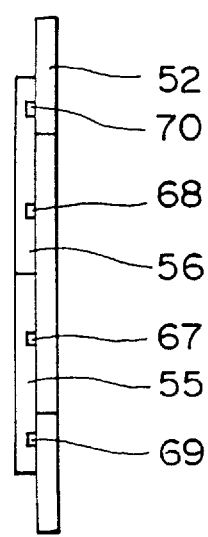
FIG. 21 is a diagram showing the lower yoke in a right side view.
Figure 22:
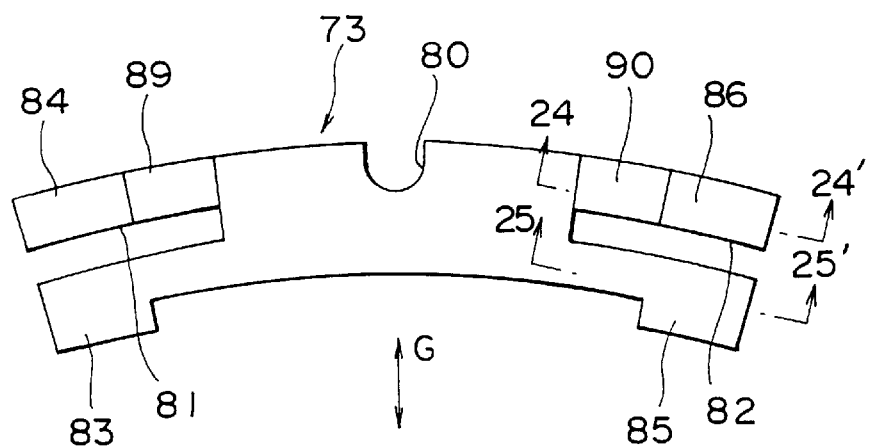
FIG. 22 is a diagram showing a holding member used in the construction of FIG. 20 in a plan view.

As indicated in FIG. 20, the first pressing part 83 and the third pressing part 85 that form together the holding member 73, press, upon mounting on the lower yoke 52, the side walls of the magnets 55 and 56 that are held upon the yoke 52, at a side away from the side walls that face the actuator 26. Thereby, the side walls of the magnets 55 and 56 facing the actuator 26 are urged to the projections 67 and 68, and an accurate positioning of the magnets 55 and 56 is achieved with respect to the direction to the rotational axis of the actuator 26. Further, the magnets 55 and 56 are supported laterally by the projections 69 and 70 that engage with the side walls of the magnets 55 and 56 as indicated in FIG. 20, and an accurate positioning of the magnets with respect to the moving direction of the actuator 26 is achieved.

Similarly, upon mounting of the first pressing part 83 and the third pressing part 85 of the holding member 73 on the upper yoke 53, the pressing parts 83 and 85 urge the side walls of the magnets 57 and 58 at a side away from the side wall that faces the actuator 26, and the magnets 57 and 58 are urged to the projections 64 and 65 that engage with the side walls of the magnets 57 and 58 at the side of the actuator 26. Thereby, an accurate positioning of the magnets 57 and 58 with respect to the radial direction of the actuator 62 is achieved. Further, the positioning of the magnets 57 and 58 in the moving direction of the actuator 62 is achieved as a result of the engagement of the magnets 57 and 58 with the projections carried on the yoke 53 corresponding to projections 71 and 72 (not illustrated).

Next, the mounting of the magnets 59 and 60 on the side yoke 51 will be described. It should be noted that the magnets 59 and 60 are attached to the yoke 51 by means of the magnetic force that has been generated by the magnets 59 and 60 themselves. Thereby, the second pressing part 84 and the fourth pressing part 86 of the holding member 73, which is also provided on the side yoke 51, engage with the lower side walls of the magnets 59 and 60, while the second pressing part 84 and the fourth pressing part 86 of the holding member 73 engage with the upper side walls of the magnets 59 and 60. Thereby, an accurate positioning of the magnets 59 and 60 is achieved.

According to the foregoing construction, it is possible to mount the magnets 55–60 upon the corresponding yokes 51–53, without using adhesives but by means of the magnetic force formed by the magnets themselves. Thereby, the movement of the magnets on the mounting surface of the yoke is effectively eliminated by means of the plurality of projections and the holding members. Thus, even when heating of adhesive the coils 44 and 45 occurs, the release of contaminating gases does not occur, and the interior of the magnetic disk drive is held clean.

Figure 26:
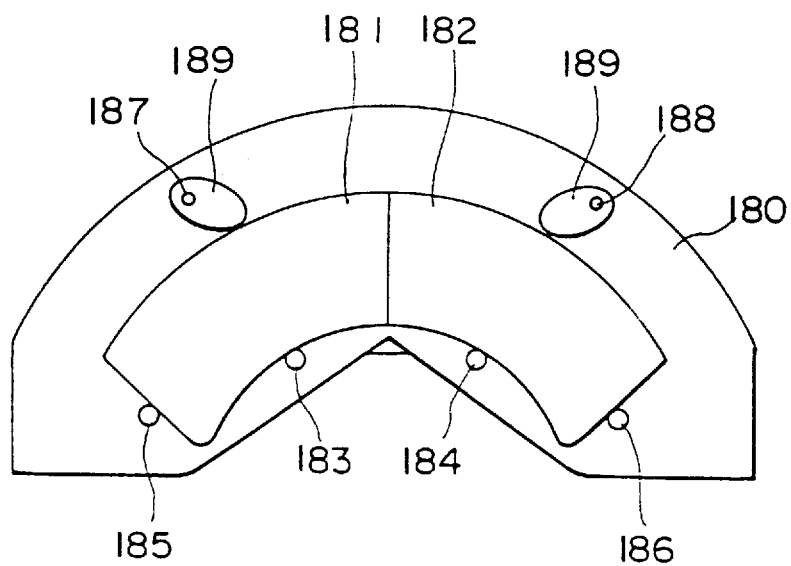
FIG. 26 is a diagram showing a fourth embodiment of the present invention in a plan view.

Next, a second embodiment of the present invention will be described with reference to FIG. 26, wherein the present embodiment is distinguished over the previous embodiments mainly in the construction of the holding member. In the present embodiment, a lower yoke 180 carries, on the surface on which magnets 181 and 182 are mounted, projections 183 and 184 such that the projections 183 ad 184 engage with the side walls of the magnets 181 and 182 at a side facing the actuator 26. In addition, the foregoing surface of the yoke 180 is provided with projections 185 and 186 for engagement with both longitudinal ends of the magnets 181 and 182. In addition, the yoke 180 carries thereon projections 187 and 188 for engagement with the side walls of the magnets 181 and 182 at a side away from the actuator 26, wherein the projections 187 and 188 are provided with levers 189 such that the lever 189 is rotatable about the corresponding projection.

The levers 189 are formed in an elliptical shape and are rotatable about the projection such as the projection 187 or 188. In response to the rotation of the lever 189, the circumferential surface of the lever 189 urges the side wall of the magnets 181 and 182 at the side away from the actuator 26, and the positioning of the magnets 181 and 182 is achieved thereby.

The construction of the present embodiment provides an effect similar to the effect achieved by the first through third embodiments.

Figure 27:
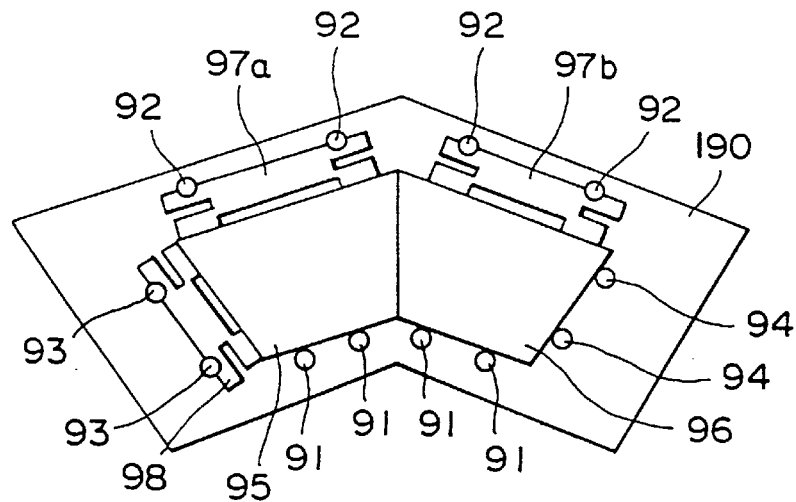
FIG. 27 is a diagram showing a fifth embodiment of the present invention in a plan view.

Next, a fifth embodiment of the present invention will be described with reference to FIG. 27, wherein the embodiment of FIG. 27 is different over the fourth embodiment mainly with respect to the shape of the yoke and the magnet as well as the shape of the holding member.

Referring to FIG. 27, the magnetic circuit includes a yoke 190 that has a shape formed of a pair of identical trapezoidal elements provided adjacent with each other. The yoke 190 carries thereon first group projections including four projections 91 at a side close to the actuator 26. Further, second group projections including four projections 92 are provided also on the yoke 190 at the side away from the actuator 26. Additionally, two projections 93 are provided in the vicinity of a longitudinal edge of the yoke 190, and two more projections 94 are provided in the vicinity of the opposite longitudinal edge of the yoke 190, wherein the projections 91, 92, 93 and 94 are arranged in conformity to the outer shape of the magnets 95 and 96 each having a trapezoidal shape and disposed on the yoke 190 adjacent to and in contact with each other.

It should be noted that magnets 95 and 96 are mounted upon the yoke 190 such that the bottom edge of the trapezoidal magnets 95 and 96 engages with the first group projections 91 and such that the top edge of the trapezoidal magnets engages with the second group projections 92. Thereby, the oblique side edge of the magnet 95 engages with the third group projections 93, while the oblique side edge of the magnet 96 engages with the fourth group projections 94.

It should be noted that the second group projections 92 carry thereon a first pressing member 97a that engages with the top edge of the magnet 95 to urge the same to the projections 91, and a second pressing member 97a that engages with the top edge of the magnet 96 to urge the same to the projections 91. Further, the projections 93 carry a third pressing member 98 that engages with the oblique edge of the magnet 95 and urges the same to the magnet 96 such that the magnet 96 is urged to the projections 94.

The foregoing construction is effective similarly to the first through fourth embodiments.

Figure 28:
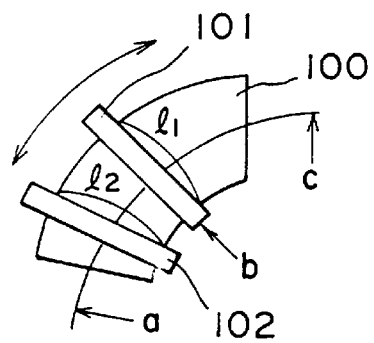
FIG. 28 is a diagram for explaining the effect of the fifth embodiment for a fan-shaped magnet.
Figure 29:
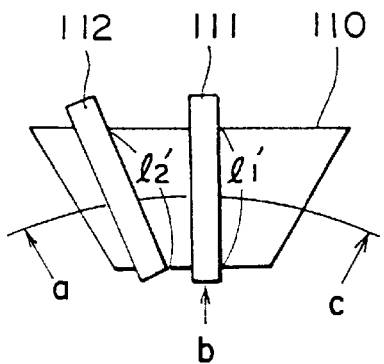
FIG. 29 is a diagram for explaining the effect of the fifth embodiment for a trapezoidal magnet.
Figure 30:
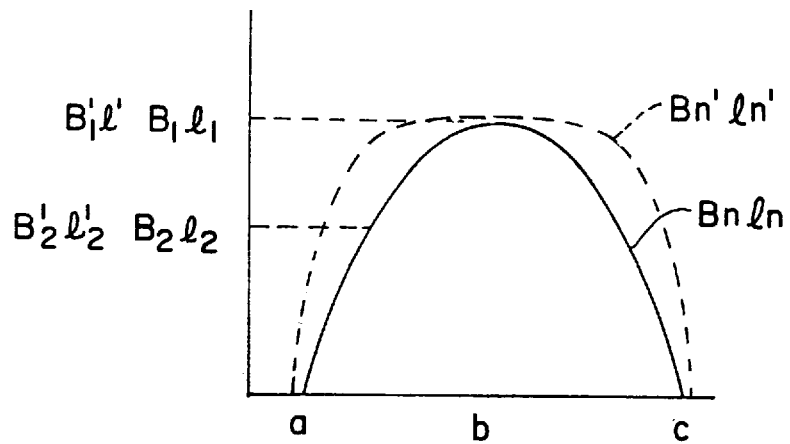
FIG. 30 is a diagram showing the flux density as a function of the position on a fan shaped magnet.

In the present embodiment, one can enjoy other advantageous features obtained as a result of use of the trapezoidal magnets. Hereinafter, this additional advantageous feature will be described with reference to FIGS. 28–30. In FIG. 28, the magnetic circuit includes a fan-shaped magnet 100, and coils 101 and 102 are provided around the magnet 100. In FIG. 29, the magnetic circuit includes a trapezoidal magnet 110 and coils 111 and 112 that are wound around the magnet 110. Further, FIG. 30 explains the relationship between the flux density and the position of the coil on the magnet with relation to the points labelled a, b and c in FIG. 28

It should be noted that the relationship between the flux density and the position on the magnet is substantially identical in the fan-shaped magnet 100 and the trapezoidal magnet 110. On the other hand, in terms of the torque constant $B_n l_n$, of a voice coil motor, there holds a relationship for the fan-shaped magnet 100 as effective coil length: $l_1 = l_2$;
flux density : $B_1 > B_2$;
which leads to the torque relationship $B_1 l_1 > B_2 l_2$.

In the trapezoidal magnet 110 of FIG. 29, on the other hand, there holds a relationship effective coil length: $l'_1 < l'_2$; (see FIG. 30)
flux density: $B_1 > B_2$; however $l'_2 > l_2$ (see FIGS. 28 & 29)
which leads to the torque relationship
$B_2 l'_2 > B_2 l_2$.

It is desired that the torque constant $B_n l_n$ is uniform as much as possible in the range in which the coil moves. By using the trapezoidal magnet 110 in place of the fan-shaped magnet 100, one can increase the torque constant in correspondence to the edge parts of the magnet, and the variation of the torque is minimized. This increase is represented by the dotted curve in FIG. 30. Further, such trapezoidal magnets are easy to fabricate and the cost of the magnetic disk drive can be reduced.

Figure 31:
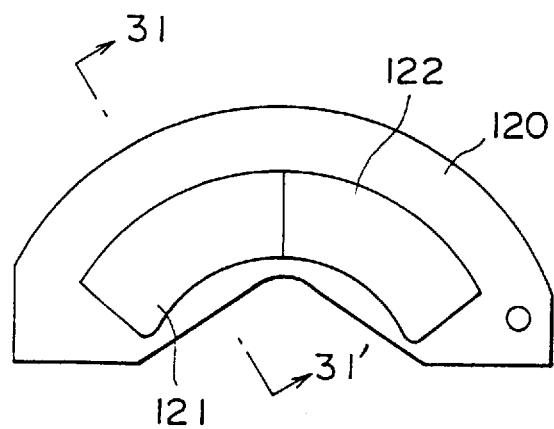
FIG. 31 is a diagram showing a lower yoke according to a sixth embodiment in a plan view.
Figure 32:
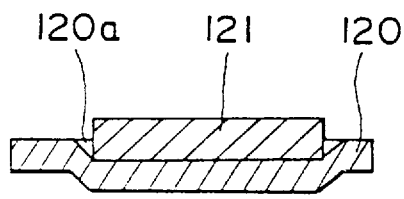
FIG. 32 is a cross sectional view taken along a line 31–31' of FIG. 31.

Next, a sixth embodiment of the present invention will be described with reference to FIGS. 31 and 32, wherein FIG. 31 shows the lower yoke of the sixth embodiment in a bottom view, while FIG. 32 shows the yoke of FIG. 31 in a cross sectional view taken along a line 31–31'. The present embodiment differs mainly with respect to the mounting of the magnets upon the yoke, while other features of the present embodiment are substantially identical with previously described references.

Referring to FIG. 31 showing a lower yoke 120 of the sixth embodiment, there is formed a depression 120a having a shape in conformity with the shape of magnets 121 and 122 that are to be mounted on the lower yoke 120. Thereby, the magnets 121 and 122 are attached to the yoke 120 by own magnetic forces.

As the mounting of the magnets to the upper yoke is identical with the construction of FIGS. 31 and 32, further description will be omitted.

According to the sixth embodiment, one can mount the magnets 121 and 122 upon the yoke 120, without using adhesives, while effectively eliminating the movement of the magnets along the surface of the yoke 120 on which the magnets 121 and 122 are mounted, by means of the engagement of the magnets with the side wall of the depression 120a. Thereby, one can eliminate the release of contaminant gases even in the case where the moving coils wound around the yoke has caused heating.

Further, the present invention is not limited to the embodiments described heretofore, but various variations and modifications may be made without departing from the scope of the invention.

What is claimed is:

1. A magnetic disk drive for recording and reproducing information on and from a magnetic recording disk, comprising:

a plurality of magnetic disks assembled with each other to rotate coaxially about a first common rotational axis, said magnetic disks each having first and second recording surfaces;

first driving means for driving said plurality of magnetic disks about said first common rotational axis;

a plurality of swing arms each being provided in correspondence to each of said recording surfaces of said magnetic disks, said plurality of swing arms being held rotatable about a second common rotational axis and each carrying at one end thereof at least one magnetic head;

a voice coil motor for driving said plurality of swing arms such that said plurality of swing arms are rotated about said second common rotational axis, a sealed enclosure for housing said magnetic disks, said swing arms, said first driving means, and said voice coil motor, said voice coil motor comprising, a magnetic yoke for guiding a magnetic flux, said yoke having first and second mutually opposing principal surfaces;

a gap between said first and second mutually opposing principal surfaces;

a first permanent magnet detachably mounted exclusively by its magnetic attraction to said first principal surface for creating said magnetic flux;

a coil, movable in parallel to said principal surfaces, provided in said gap to interlink with said magnetic flux; and first inhibition means on said first principal surface for inhibiting movement of said permanent magnet along said first principal surface.

2. A magnetic disk drive as claimed in claim 1 wherein said inhibition means comprises a plurality of projections disposed along a side wall of said permanent magnet for engagement therewith.

3. A magnetic disk drive as claimed in claim 1, wherein said permanent magnet is mounted in direct contact with said first principal surface across an entire face of said permanent magnet which opposes said first principal surface.

4. A magnetic disk drive as claimed in claim 1, further comprising:

a second permanent magnet detachably mounted by its magnetic attraction with said second principal surface to said second principal surface for creating said magnetic flux in cooperation with said first permanent magnet;

second inhibition means on said second principal surface for inhibiting movement of said second permanent magnet along said second principal surface.

5. A magnetic disk drive as claimed in claim 4, wherein the mounting of said second permanent magnet to said second principal surface is accomplished exclusively by said magnetic attraction with said second principal surface.

6. A magnetic disk drive for recording and reproducing information on and from a magnetic recording disk, comprising:

a plurality of magnetic disks assembled with each other to rotate coaxially about a first common rotational axis, said magnetic disks each having first and second recording surfaces;

first driving means for driving said plurality of magnetic disks about said first common rotational axis;

a plurality of swing arms each being provided in correspondence to each of said recording surfaces of said magnetic disks, said plurality of swing arms being held rotatable about a second common rotational axis and each carrying at one end thereof at least one magnetic head;

a voice coil motor for driving said plurality of swing arms such that said plurality of swing arms are rotated about said second common rotational axis, a sealed enclosure for housing said magnetic disks, said swing arms, said first driving means, and said voice coil motor, said voice coil motor comprising, a magnetic yoke for guiding a magnetic flux, said yoke having first and second mutually opposing principal surfaces;

a gap between said first and second mutually opposing principal surfaces;

a first permanent magnet detachably mounted by its magnetic attraction to said first principal surface for creating said magnetic flux;

a second permanent magnet detachably mounted exclusively by its magnetic attraction with said second principal surface to said second principal surface for creating said magnetic flux in cooperation with said first permanent magnet;

a coil, movable in parallel to said principal surfaces, provided in said gap to interlink with said magnetic flux;

first inhibition means on said first principal surface for inhibiting movement of said first permanent magnet along said first principal surface; and second inhibition means on said second principal surface for inhibiting movement of said second permanent magnet along said second principal surface.

* * * * *

UNITED STATES PATENT AND TRADEMARK OFFICE
CERTIFICATE OF CORRECTION

PATENT NO. : 5,822,156
DATED : October 13, 1998
INVENTOR(S) : Suzuki et al.

It is certified that error appears in the above-identified patent and that said Letters Patent is hereby corrected as shown below:

On the title page

Under "[54]" for the title before "coil" insert --voice--

Under "[56] of References Cited" for Patent No. 4,544,972 delete "Kpgura" and insert --Kogure-- therefor Under "[73] Assignees" delete "Sinter Linited" and insert --Sinter Limited-- therefor

UNITED STATES PATENT AND TRADEMARK OFFICE
CERTIFICATE OF CORRECTION

PATENT NO. : 5,822,156
DATED : October 13, 1998
INVENTOR(S) : Suzuki et al.

It is certified that error appears in the above-identified patent and that said Letters Patent is hereby corrected as shown below:

Column 1, line 1, in the title, before "coil"

insert --voice--

Signed and Sealed this

Sixteenth Day of March, 1999

Attest:

Q. TODD DICKINSON

*Attesting Officer*   *Acting Commissioner of Patents and Trademarks*